United States Patent [19]

Sihvola et al.

[11] Patent Number: 5,724,342
[45] Date of Patent: Mar. 3, 1998

[54] METHOD FOR RECEIVING A SIGNAL IN A SYNCHRONOUS DIGITAL TELECOMMUNICATIONS SYSTEM

[75] Inventors: Tuomo Sihvola, Helsinki; Toni Oksanen, Espoo; Sixten Johansson, Helsinki, all of Finland

[73] Assignee: Nokia Telecommunications Oy, Espoo, Finland

[21] Appl. No.: 640,936

[22] PCT Filed: Nov. 10, 1994

[86] PCT No.: PCT/FI94/00506

§ 371 Date: Jun. 28, 1996

§ 102(e) Date: Jun. 28, 1996

[87] PCT Pub. No.: WO95/13673

PCT Pub. Date: May 18, 1995

[30] Foreign Application Priority Data

Nov. 12, 1993 [FI] Finland .................................. 935026

[51] Int. Cl.[6] ....................................................... H04J 3/12
[52] U.S. Cl. ........................... 370/242; 370/506; 370/522
[58] Field of Search ..................................... 370/503, 522, 370/506, 528, 509, 252, 505, 242, 244, 246; 371/20.1, 69.1, 57.1; 375/371, 373, 365, 366

[56] References Cited

U.S. PATENT DOCUMENTS 5,210,762  5/1993  Weeber et al. .
5,455,832  10/1995  Bowmaster ............................ 371/20.1
5,471,477  11/1995  Dries et al. ............................. 370/522
5,539,750  7/1996  Kivi-Mannila et al. ................ 370/506

FOREIGN PATENT DOCUMENTS 415 112     3/1991   European Pat. Off. .
525 770     2/1993   European Pat. Off. .
548 414     6/1993   European Pat. Off. .
WO93/25031  12/1993  WIPO .
94/03000    2/1994   WIPO .
94/13073    6/1994   WIPO .
94/22249    9/1994   WIPO .

*Primary Examiner*—Chau Nguyen
*Attorney, Agent, or Firm*—Cushman Darby & Cushman IP Group of Pillsbury Madison & Sutro LLP

[57] ABSTRACT

A method for receiving a signal used in a synchronous digital telecommunications system, such as the SDH or SONET system, in which pointer interpretation is performed where a receiver has three possible main states, the receiver entering from one main state to another under the control of event number counting. The main states are a normal state, a loss of pointer state and an alarm state. The events including reception of a new pointer indicating a new pointer value, wherein the number of successive new pointers is counted, and, when being in the loss of pointer state, the normal state is entered after the new pointer has been received a predetermined number of times in success. To improve the recovery rate of data transmission, the counting of the new pointers is continued upon transition from the normal state or the alarm state to the loss of pointer state irrespective of the said transition.

2 Claims, 2 Drawing Sheets

PRIOR ART  FIG. 1a

METHOD FOR RECEIVING A SIGNAL IN A SYNCHRONOUS DIGITAL TELECOMMUNICATIONS SYSTEM

This application claims benefit of international application PCT/FI94/00506 filed Nov. 10, 1994.

BACKGROUND OF THE INVENTION

The invention relates to a method for receiving a signal used in a synchronous digital telecommunications system.

The current digital transmission network is plesiochronous, that is, each 2-Mbit/s basic multiplex system has a dedicated clock independent of any other system. It is therefore impossible to locate a single 2-Mbit/s signal in the bit stream of a higher-order system, but the higher-level signal has to be demultiplexed through each intermediate level down to the 2 Mbit/s level to extract the 2-Mbit/s signal. For this reason, especially the construction of branch connections requiring several multiplexers and demultiplexers has been expensive. Another disadvantage of the plesiochronous transmission network is that equipments from two different manufacturers are not usually compatible.

The above mentioned drawbacks, among other things, have led to the introduction of the new synchronous digital hierarchy SDH specified e.g. in the CCITT recommendations G.707 to G.709 and G.781 to G.784. The synchronous digital hierarchy is based on STM-N transfer frames (Synchronous Transport Modules) located on several levels of hierarchy N (N=1,4,16 . . . ). Existing PCM systems, such as 2-, 8- and 32-Mbit/s systems are multiplexed into a synchronous 155.520-Mbit/s frame of the lowest level of the SDH (N=1). Consistently with the above, this frame is called the STM-1 frame. On the higher levels of hierarchy the bit rates are multiples of the bit rate of the lowest level. In principle, all nodes of the synchronous transmission network are synchronized with a single clock. However, if some of the nodes would lose connection to the common clock, this would result in problems in connections between the nodes. It is also necessary that the phase of the frame can be detected easily at the reception. On account of the above-mentioned factors, the SDH telecommunication utilizes a pointer, i.e. a number that indicates the phase of payload within a frame. The pointer thus points that byte in the STM frame from which the payload begins.

The STM-N frame comprises a matrix with 9 rows and N×270 columns so that there is one byte at the junction point between each row and the column. Rows 1–3 and rows 5–9 of the N×9 first columns comprise a section overhead SOH, and the row 4 comprises an AU pointer. The rest of the frame structure is formed a section having the length of N=261 columns and containing the payload section of the STM-N frame. The row of the STM-1 frame is thus 270 bytes in length, as described above. The payload section comprises one or more administration units AU.

Each byte in the AU-4 unit has its own location number. The above-mentioned AU pointer contains the location of the first byte of the VC-4 container in the AU-4 unit. The pointers allow positive or negative pointer justifications to be performed at different points in the SDH network. If a virtual container having a certain clock frequency is applied to a network node operating at a clock frequency lower than the above-mentioned clock frequency of the virtual container, the data buffer will be filled up. This requires negative justification: one byte is transferred from the received virtual container into the overhead section of the frame to be transmitted while the pointer value is decreased by one. If the rate of the received virtual container is lower than the clock rate of the node, the data buffer tends to be emptied, which calls for positive justification: a stuff byte is added to the received virtual container and the pointer value is incremented by one.

The frame structures described briefly above and the SDH system itself are described more closely e.g. in Finnish Patent Application 922 567 and in the publications mentioned in the patent application, which are referred to for a more detailed description.

The above-mentioned pointer mechanism allows flexible phase shift of different units within the STM frame and also reduces the size of buffer memories required in the network. In principle, the SDH system comprises pointers on two levels: AU pointers and TU pointers, which indicate the first byte of a corresponding virtual container VC within the AU or TU unit, respectively. The CCITT specifications relating to the pointer are set forth in Reference [1], which is referred to for a more detailed description.

As shown in FIG. 1a, the AU-4 pointer, for example, consists of nine successive bytes H1, Y, Y . . . H3, of which bytes H1 and H2 are shown separately in FIG. 1b. The actual pointer value PTR consists of the ten last bits (bits 7 to 16) of the word formed by bytes H1 and H2. Correspondingly, the values of the TU-11, TU-12 and TU-2 pointers consist of the ten last bits of the word formed by bytes V1 and V2. The TU-3 pointer consists of bytes H1 and H2 in the same way as the AU-4 pointer (FIG. 1b). The AU and TU pointers have quite similar coding even in other respects; there are, however, some differences, which will be described in the following.

The pointer value must be within a certain range in order to be acceptable. The acceptable decimal value of the AU-4 pointer is from 0 to 782, and the acceptable decimal value of the TU-12 pointer, for example, is from 0 to 139. These values are called offset values, as they (within the frame structure) indicate the offset between the pointer and the first byte of the corresponding virtual container.

The new data flag NDF determined by the N bits (bits 1 to 4) allows arbitrary changes in the pointer value if they are the result of a change taking place in the payload. Normal operation (NDF_disabled) is indicated by the N-bit values "0110", and the new pointer value (NDF_enable) by the N-bit values "1001" (i.e. by inverting the bits of the normal state). In this way the new data flag, together with the new pointer value, indicates a change in the alignment of the virtual container within the frame, if the change is caused by some other reason than positive or negative justification (the transmitter may force a new alignment on the virtual container within the frame structure).

If the new data flag indicates a new pointer value (NDF_enable), and the pointer value consists of one bits (i.e. if bits 1 to 16 are "1001SS1111111111" wherein the S-bits may be independently of one another one or zero), it signifies concatenation. Concatenation means that, e.g., AU-4 units are concatenated into one larger unit (so-called AU-4-Xc), which may transfer payloads which require a higher capacity than the C-4 container. (Correspondingly, TU-2 units can be concatenated into a larger unit capable of transferring greater payloads than the capacity of the C-2 container).

If all of the bits 1 to 16 are ones, it signifies alarm (AIS, Alarm Indication Signal).

The S-bits (bits 5 and 6) indicate on which level of hierarchy (e.g. TU-12) the operation is currently taking place.

The I- and D-bits of the 10-bit pointer word are used to indicate the positive and negative justification described above. If at least three out of five increment bits, or I-bits (bits 7, 9, 11, 13 and 15), are inverted, it signifies positive justification (if certain additional conditions are met).

If at least three out of five decrement bits, or D-bits (bits 8, 10, 12, 14, 16), are inverted, it signifies negative justification (if certain additional conditions are met).

The pointer interpretation described briefly above is based on Annex B of CCITT recommendations G.709 and G.783 (Reference [2]). In the interpretation, the interpretor of the receiver has three possible main states: the normal state NORM, the alarm state AIS (Alarm Indication Signal), and the loss of pointer state LOP, which will be described more closely below. In the LOP state, transition to the normal state NORM can take place if the same pointer is received three times in succession. With TU-12 and TU-2 frames, this transition thus requires a time period corresponding to at least twelve STM-1 frames, and with TU-3 frames a time period corresponding to at least three STM-1 frames. In the case of TU-12 and TU-2 frames, for instance, this thus means that the loss of pointer state lasts at least 1,500 μs, whereas the time period after which the normal state can be resumed may actually be much longer.

SUMMARY OF THE INVENTION

The object of the present invention is to eliminate the above-described drawback and provide a method which speeds up the transition of data transmission back to normal state.

The idea of the invention is that instead of starting the counting of the new pointer from the beginning, as defined in the CCITT recommendations, on transition from the normal state NORM or alarm state AIS to the loss of pointer state LOP, the counter is allowed to step normally in spite of the state transition, whereby transition back to the normal state NORM will take place clearly more rapidly.

BRIEF DESCRIPTION OF THE DRAWINGS

In the following the invention will be described more closely still referring to FIG. 2 in the examples shown in the attached drawings. In the drawings:

FIG. 1a shows an AU-4 pointer;

DETAILED DESCRIPTION

Figure 1B:
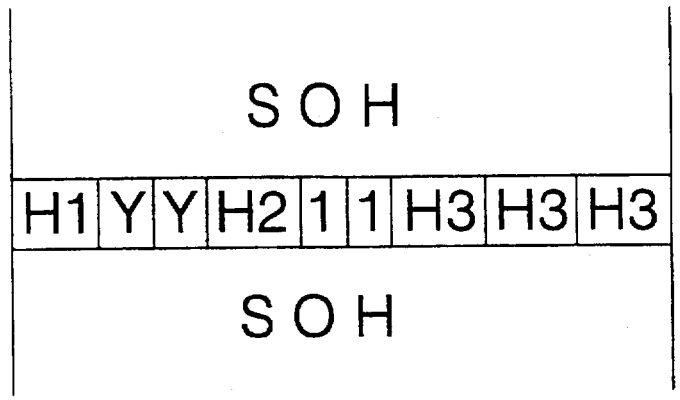
FIG. 1b shows bytes H1 and H2 in the AU-4 pointer shown in FIG. 1a in more detail.
Figure 1B:
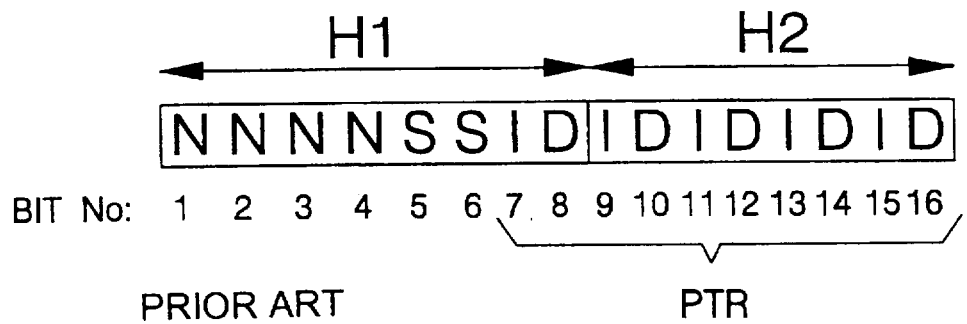
Figure 2:
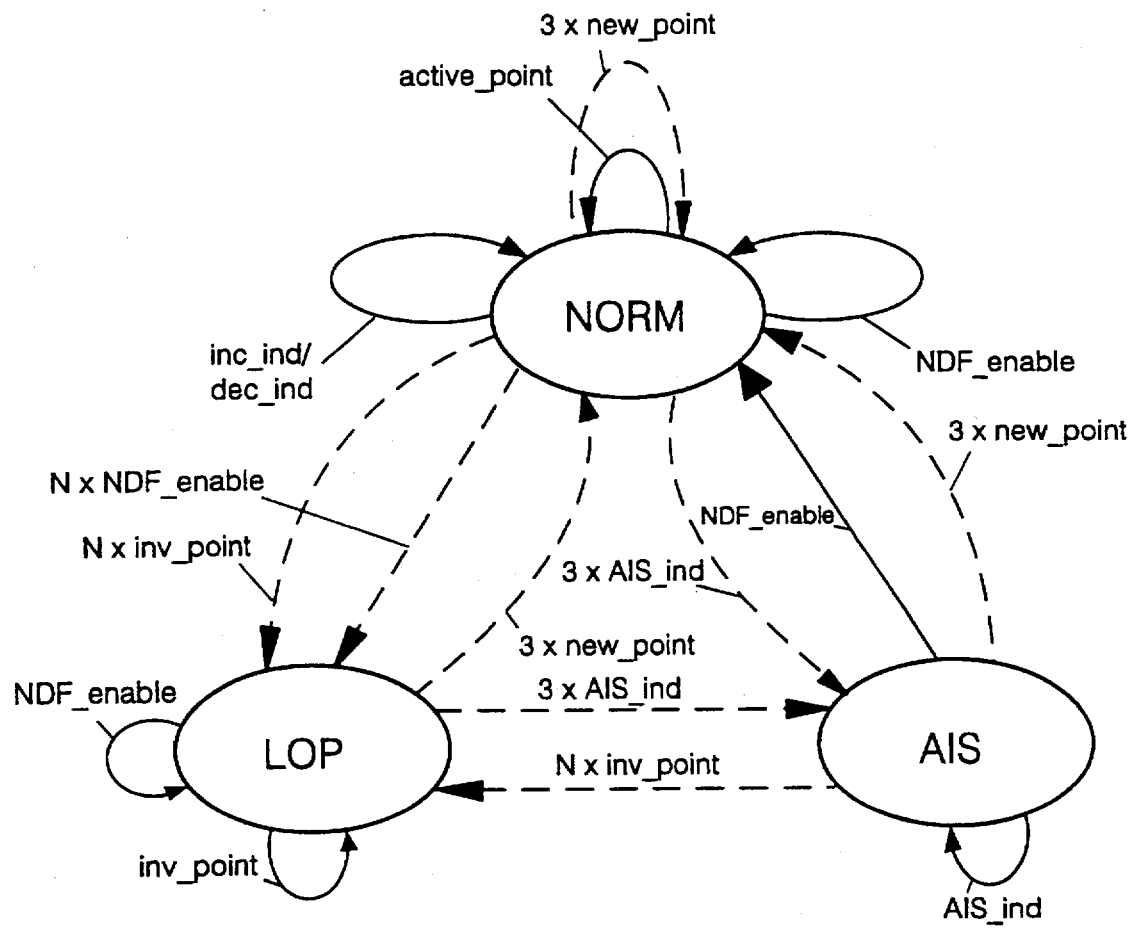
FIG. 2 is a state diagram illustrating the main states of the receiver and transitions in the different states.

As in FIG. 2, the pointer interpretation effected in the receiver can be illustrated as a state diagram in which the interpretation machine of the receiver has the above-mentioned main states: the normal state NORM, the alarm state AIS (Alarm Indication Signal), and the loss of pointer state LOP.

The events possible in the main states are thus the result of the interpretation of the received pointer; they are shown for each state in the following three tables.

| NORM state event | Definition |
| --- | --- |
| active_point (active pointer) | The new data flag (NDF) has the value "normal" (NDF_disabled), the SS-bits are correct, and the offset value is within the acceptable range and equal to the valid offset value. |
| new_point (new pointer) | The new data flag has the value "normal" (NDF_disabled), the SS-bits are correct, and the offset value is within the acceptable range and unequal to the valid offset value. |
| NDF_enable (new data flag) | The new data flag has the value "new" (NDF_enable), the SS-bits are correct, and the offset value is within the acceptable range. |
| AIS_ind (AIS alarm) | The 16-bit pointer word has the value "1111 1111 1111 1111". |
| inc_ind (increment data) | The new data flag has the value "normal" (NDF_disabled), the SS-bits are correct, the majority of I-bits are inverted, and the majority of D-bits are not inverted, and the value "new" for the new data flag (NDF_enable), increment data (inc_ind) or decrement data (dec_ind) has not been received in the three preceding frames. |
| dec_ind (decrement data) | The new data flag has the value "normal" (NDF_disabled), the SS-bits are correct, and the majority of D-bits are inverted, and the majority of I-bits are not inverted, and the value "new" for the new data flag (NDF_enable), increment data (inc_ind) or decrement data (dec_ind) has not been received in the three preceding frames. |
| NORM_inv_point (invalid pointer of the NORM state) | If AIS alarm, the value "new" for the new data flag (NDF_enable) or the active pointer (active_point) is not received. |

| AIS state event | Definition |
| --- | --- |
| active_point (active pointer) | not defined |
| new_point (new pointer) | The new data flag (NDF) has the value "normal" (NDF_disabled), the SS-bits are correct, and the offset value is within the acceptable range. |
| NDF_enable (new data flag) | The new data flag has the value "new" (NDF_enable), the SS-bits are correct, and the offset value is within the acceptable range. |
| AIS_ind (AIS alarm) | The 16-bit pointer word has the value "1111 1111 1111 1111". |
| inc_ind (increment data) | not defined |
| dec_ind (decrement data) | not defined |
| AIS_inv_point (invalid pointer of the AIS state) | (I) If AIS alarm is not received and the value "new" for the new data flag (NDF_enable) is not received, or (II) if AIS alarm is not received. |

| LOP state event | Definition |
| --- | --- |
| active_point (active pointer) | not defined |
| new_point (new pointer) | The new data flag has the value "normal" (NDF_disabled), the SS-bits are correct, and the offset value is within the acceptable range. |
| NDF_enable (new data flag) | The new data flag has the value "new" (NDF_enabled), the SS-bits are correct, and the |

-continued

| | offset value is within the acceptable range. |
|---|---|
| AIS_ind (AIS alarm) | The 16-bit pointer word has the value "1111 1111 1111 1111". |
| inc_ind (increment data) | not defined |
| dec_ind (decrement data) | not defined |
| LOP_inv_point (invalid pointer of the LOP state) | (I) The counter of the invalid pointer is not updated at all, or (II) all pointer values that are unequal to the AIS alarm, or (III) all pointer values that are unequal to the AIS alarm and the value "new" for the new data flag. |

As can be seen from the above tables, the above-mentioned bytes H1 and H2 (bits 1 to 16) of the pointer (or with TU-11, TU-12 and TU-2 pointers, the bytes V1 and V2) can indicate up to seven different events.

In practice, the transition of the receiver between the different main states and to another internal state within a main state is controlled by means of counters as defined in the following table. The index (N or 3) at the beginning of the name of the counter indicates the maximum value of the counter. The counters are modulo counters, i.e. when the counter value reaches its upper limit, the counter starts over again.

| COUNTER | OPERATION |
|---|---|
| N × NDF_enable (NDF counter) wherein (N = 8 ... 10) | Counts successive NDF_enable events and controls transition from NORM state to LOP state. |
| 3 × new_point (counter of the new pointer) | Counts successive new_point events and controls transition from LOP and AIS states to NORM state, and from NORM state to NORM state (change in the offset value). |
| N × inv_point (counter of an invalid pointer) | Counts successive inv_point events and controls transition from NORM and AIS states to LOP state. |
| 3 × AIS_ind (alarm counter) | Counts successive AIS_ind events and controls transition from NORM and LOP states to AIS state. |

When the counter reaches its maximum value, the following operations are performed in the different states:

1. NORM state
   N×NDF_enable: transition to LOP state,
   3×new_point: transition to NORM state (change in the offset value),
   N×inv_point: transition to LOP state,
   3×AIS_ind: transition to AIS state.
2. LOP state
   N×NDF_enable: irrelevant,
   3×new_point: transition to NORM state,
   N×inv_point: irrelevant,
   3×AIS_ind: transition to AIS state.
3. AIS state
   N×NDF_enable: irrelevant,
   3×new_point: transition to NORM state,
   N×inv_point: transition to LOP state,
   3×AIS_ind: irrelevant.

In order that the state transition could take place, three or N events, respectively, have to be successive relative to each other.

The counter of the new pointer controls the process for finding a correct frame synchronization if the pointer value has been changed erroneously. The offset values of three successive new pointers must be equal, otherwise the counter of the new pointer is reset. For this reason, it is likely to require a longer time period than three STM-1 frames (or twelve STM-1 frames if the STM-1 signal contains TU-12 or TU-2 frames). In practice, N has a value of from 8 to 10.

If an invalid pointer is received, the counter of the invalid pointer is incremented by one, otherwise the error counter is reset. If the counter of the invalid pointer reaches its maximum value, the LOP state is entered from the normal and alarm state. The processing of an invalid pointer is described more closely in Finnish Patent Application 923 061, which is referred to for a more detailed description. From the point of view of the present invention, however, it is irrelevant whether an invalid pointer is processed in full compliance with the CCITT recommendations or as described in Finnish Patent Application 923 061, for instance.

Transition from the normal state NORM to the loss of pointer state LOP may also take place when the NDF flap counter achieves its maximum value, which requires N successive NDF_enable events.

In FIG. 2 the state transitions described above are indicated by broken lines. FIG. 2 also illustrates reception of a single new data flag (together with an acceptable pointer value) in the alarm state, which leads to transition to the normal state NORM. This is the only single event which causes transition from one main state to another.

In addition, FIG. 2 illustrates other changes occurring in the normal state. Such changes are (1) reception of increment or decrement data inc_ind/dec_ind, and (2) reception of a single new data flap, both of these causing a change in the offset value in the normal state, and reception of the active pointer (active_point). The figure also illustrates internal changes occurring in the AIS and LOP states.

As pointer interpretation as such does not fall within the scope of the present invention, Finnish Patent Applications 923 061 and 923 062 are referred to, where the interpretation process is illustrated by means of a flow diagram. The present invention may utilize either the same interpretation or the same interpretation so modified that each increment or decrement data item is accepted only if the value "new" for the new data flap (NDF_enable), the increment data (inc_ind) or the decrement data (dec_ind) has not been received in the three preceding frames and if the S-bits have been received correctly. The latter alternative, which has been used in the tables above, is in full compliance with the CCITT recommendations.

As mentioned above, in the prior art methods, transition from the loss of pointer state LOP back to the normal state requires a time period corresponding to at least twelve STM-1 frames in the case of TU-12 and TU-2 frames and a time period corresponding to at least three STM-1 frames in the case of TU-3 frames. According to the present invention, this transition is speeded up in a very simple way, i.e. by neglecting that resetting of the counter of the new pointer counting successive new pointers (new_point) which would be caused by transition from NORM state to LOP state. According to the present invention, transition from LOP state back to NORM state can be accepted in the case of TU-12 and TU-2 frames after four STM-1 frames, and in the case of TU-3 frames after one STM-1 frame in cases shown in the following table. The columns on the left side of the table present the interpretation according to the present invention; columns on the right side present, for the sake of comparison, the interpretation according to the CCITT recommendations. Successive STM-1 frames have been numbered from 1 to 53. The example concerns a case where the STM-1 signal contains TU-12 frames (or TU-11 or TU-2 frames), the received pointer being known after each V2 byte.

| STM-1 frame | Received pointer | Method according to the invention | | | | Method according to CCITT | | | |
|---|---|---|---|---|---|---|---|---|---|
| | | Active pointer | INV_POINT counter | NEW_POINT counter | Pointer state | Active pointer | INV_POINT counter | NEW_POINT counter | Pointer state |
| 1(V1) | | 20 | 0 | 0 | NORM | 20 | 0 | 0 | NORM |
| 2(V2) | 20 | 20 | 0 | 0 | NORM | 20 | 0 | 0 | NORM |
| 3(V3) | | 20 | 0 | 0 | NORM | 20 | 0 | 0 | NORM |
| 4(V4) | | 20 | 0 | 0 | NORM | 20 | 0 | 0 | NORM |
| 5(V1) | | 20 | 0 | 0 | NORM | 20 | 0 | 0 | NORM |
| 6(V2) | 39 | 20 | 1 | 1 | NORM | 20 | 1 | 1 | NORM |
| 7(V3) | | 20 | 1 | 1 | NORM | 20 | 1 | 1 | NORM |
| 8(V4) | | 20 | 1 | 1 | NORM | 20 | 1 | 1 | NORM |
| 9(V1) | | 20 | 1 | 1 | NORM | 20 | 1 | 1 | NORM |
| 10(V2) | 24 | 20 | 2 | 1 | NORM | 20 | 2 | 1 | NORM |
| 11(V3) | | 20 | 2 | 1 | NORM | 20 | 2 | 1 | NORM |
| 12(V4) | | 20 | 2 | 1 | NORM | 20 | 2 | 1 | NORM |
| 13(V1) | | 20 | 2 | 1 | NORM | 20 | 2 | 1 | NORM |
| 14(V2) | 120 | 20 | 3 | 1 | NORM | 20 | 3 | 1 | NORN |
| 15(V3) | | 20 | 3 | 1 | NORM | 20 | 3 | 1 | NORM |
| 16(V4) | | 20 | 3 | 1 | NORM | 20 | 3 | 1 | NORM |
| 17(V1) | | 20 | 3 | 1 | NORM | 20 | 3 | 1 | NORM |
| 18(V2) | 39 | 20 | 4 | 1 | NORM | 20 | 4 | 1 | NORM |
| 19(V3) | | 20 | 4 | 1 | NORM | 20 | 4 | 1 | NORM |
| 20(V4) | | 20 | 4 | 1 | NORM | 20 | 4 | 1 | NORM |
| 21(V1) | | 20 | 4 | 1 | NORM | 20 | 4 | 1 | NORM |
| 22(V2) | 39 | 20 | 5 | 2 | NORM | 20 | 5 | 2 | NORM |
| 23(V3) | | 20 | 5 | 2 | NORM | 20 | 5 | 2 | NORM |
| 24(V4) | | 20 | 5 | 2 | NORM | 20 | 5 | 2 | NORM |
| 25(V1) | | 20 | 5 | 2 | NORM | 20 | 5 | 2 | NORM |
| 26(V2) | 21 | 20 | 6 | 1 | NORM | 20 | 6 | 1 | NORM |
| 27(V3) | | 20 | 6 | 1 | NORM | 20 | 6 | 1 | NORM |
| 28(V4) | | 20 | 6 | 1 | NORM | 20 | 6 | 1 | NORM |
| 29(V1) | | 20 | 6 | 1 | NORM | 20 | 6 | 1 | NORM |
| 30(V2) | 39 | 20 | 7 | 1 | NORM | 20 | 7 | 1 | NORM |
| 31(V3) | | 20 | 7 | 1 | NORM | 20 | 7 | 1 | NORM |
| 32(V4) | | 20 | 7 | 1 | NORM | 20 | 7 | 1 | NORM |
| 33(V1) | | 20 | 7 | 1 | NORM | 20 | 7 | i | NORM |
| 34(V2) | 39 | 20 | 8 | 2 | LOP | 20 | 8 | 0 | LOP |
| 35(V3) | | 20 | 8 | 2 | LOP | 20 | 8 | 0 | LOP |
| 36(V4) | | 20 | 8 | 2 | LOP | 20 | 8 | 0 | LOP |
| 37(V1) | | 20 | 8 | 2 | LOP | 20 | 8 | 0 | LOP |
| 38(V2) | 39 | 39 | 0 | 3 | NORM | 20 | 0 | 1 | LOP |
| 39(V3) | | 39 | 0 | 3 | NORM | 20 | 0 | 1 | LOP |
| 40(V4) | | 39 | 0 | 3 | NORM | 20 | 0 | 1 | LOP |
| 41(V1) | | 39 | 0 | 3 | NORM | 20 | 0 | 1 | LOP |
| 42(V2) | 39 | 39 | 0 | 0 | NORM | 20 | 0 | 2 | LOP |
| 43(V3) | | 39 | 0 | 0 | NORM | 20 | 0 | 2 | LOP |
| 44(V4) | | 39 | 0 | 0 | NORM | 20 | 0 | 2 | LOP |
| 45(V1) | | 39 | 0 | 0 | NORM | 20 | 0 | 2 | LOP |
| 46(V2) | 39 | 39 | 0 | 0 | NORM | 39 | 0 | 3 | NORM |
| 47(V3) | | 39 | 0 | 0 | NORM | 39 | 0 | 3 | NORM |
| 48(V4) | | 39 | 0 | 0 | NORM | 39 | 0 | 3 | NORM |
| 49(V1) | | 39 | 0 | 0 | NORM | 39 | 0 | 3 | NORM |
| 50(V2) | 39 | 39 | 0 | 0 | NORM | 39 | 0 | 0 | NORM |
| 51(V3) | | 39 | 0 | 0 | NORM | 39 | 0 | 0 | NORM |
| 52(V4) | | 39 | 0 | 0 | NORM | 39 | 0 | 0 | NORM |
| 53(V1) | | 39 | 0 | 0 | NORM | 39 | 0 | 0 | NORM |

In the table, it is assumed by way of example that the values of the received pointers are 20, 39, 24, 45 120, 39, 39, 21, 39, 39, 39, 39, 39 and 39. As is to be seen from the table, the counter of the new pointer is not reset in the method according to the invention upon transition to the LOP state after frame 33, when the counter of the invalid pointer achieves its upper limit. As transition back to the normal state NORM takes place when the counter of the new pointer achieves the value three, this transition takes place in the method according to the invention eight STM-1 frames earlier than in the method complying with the CCITT recommendations.

The improvement in the recovery rate to be achieved by means of the method according to the invention depends on the reading of the counter of the new pointer upon transition to the LOP state. If the counter of the new pointer steps to the value three at the same time as the upper limit of the counter of the invalid pointer is reached, no transition to the LOP state takes place but the pointer interpretation machine remains in normal state.

It is also to be seen from the above table that the counter of the new pointer counts the number of successive identical new pointers, whereby it steps, e.g. at frame 6 to the value 1, as the value of the obtained pointer deviates from the preceding value, but it will not step onwards from the value 1, e.g. at frames 10 and 14, as the obtained pointer values deviate from the preceding values.

In the above example, it is assumed that transition to the LOP state results from the counter of the invalid pointer reaching its upper limit. The transition may equally well result from the NDF counter reaching its upper limit (cf. FIG. 2).

Both of the above examples concern a case where the LOP state is entered from the NORM state. The LOP state may equally well be entered from the alarm state AIS, in which case the resetting of the counter of the new pointer caused by the state transition is neglected when the transition takes place. Both transitions take place if N successive invalid pointers (cf. FIG. 2) are received. In the case of the AIS state, this is the only event that causes transition to the LOP state.

It is further to be noted that when the resetting of the counter of the new pointer is neglected according to the invention in cases where it would be caused by state transition, this also means that when events are interpreted, the definition of the preceding state (NORM or AIS) is used as the definition of the event of the new pointer (new_point), even though the next state (LOP) has already been entered. (As a matter of fact, the definition of the AIS state and that of the LOP states are typically identical, cf. the above tables.)

Even though the invention has been described above with reference to the examples of the attached drawings, it is obvious that the invention is not limited to them, but it can be modified within the inventive idea disclosed above and in the attached claims. Even though SDH specific terms have been used by way of example above, the invention is equally applicable e.g. in the corresponding American SONET system or any other similar system where the frame structure consists of a predetermined number of bytes of fixed length, and which frame structure comprises a pointer indicating the phase of the payload within the frame structure.

Solutions in full compliance with the CCITT recommendations, for instance, can be applied in all parts of the state diagram that are not concerned with the invention. From the point of view of the invention, it is not either essential what criteria are applied in making the decision to enter the LOP state, that is, what events are interpreted as invalid pointers or NDF_enable events. The predetermined number of new pointers after which the normal state (NORM) is entered may vary, particularly if the recommendations are changed in this respect.

References:

[1] CCITT Blue Book, Recommendation G.709: "Synchronous Multiplexing Structure", July 1992.

[2] CCITT Blue Book, Recommendation G.783: "Characteristics of Synchronous Digital Hierarchy (SDH) Multiplexing Equipment Functional Blocks," November 1992, Annex B.

We claim:

1. A method for receiving a signal used in a synchronous digital telecommunications system, the signal having a frame structure with a predetermined number of bytes of fixed length and comprising a pointer indicating the phase of payload within the frame structure, comprising:

performing pointer interpretation in regard to a receiver which has three possible main states, the receiver entering from one main state to another under the control of event number counting of a succession of events, said main states being a normal state, a loss of pointer state and an alarm state, and said events comprising reception of a new pointer indicating a new pointer value;

counting the number of successive new pointers using a new pointer counter, and, when being in the loss of pointer state, entering the normal state after a new pointer has been received a predetermined number of time in succession, including continuing said counting of the new pointers upon transition from the normal state to the loss of pointer state, irrespective of said state transition without resetting the new pointer counter in consequence of each transitional loss of pointer state.

2. A method for receiving a signal used in a synchronous digital telecommunications system, the signal having a frame structure with a predetermined number of bytes of fixed length and comprising a pointer indicating the phase of payload within the frame structure, comprising:

performing pointer interpretation in regard to a receiver which has three possible main states, the receiver entering from one main state to another under the control of event number counting of a succession of events, said main states being a normal state, a loss of pointer state and an alarm state, and said events comprising reception of a new pointer indicating a new pointer value;

counting the number of successive new pointers using a new pointer counter, and, when being in the loss of pointer state, entering the normal state after a new pointer has been received a predetermined number of time in succession, including continuing said counting of the new pointers upon transition from the alarm state to the loss of pointer state irrespective of said state transition without resetting the new pointer counter in consequence of each transition to loss of pointer state.

* * * * *